United States Patent [19]

Hardy et al.

[11] 3,777,270

[45] Dec. 4, 1973

[54] PRECISION VARIABLE PULSE RATE NULLING RADIOMETER

[75] Inventors: Walter H. Hardy, Vancouver, Canada; Kenneth W. Gray, Poolbrook Malvern, Worcestershire, England

[73] Assignee: Rockwell International Corporation, El Segundo, Calif.

[22] Filed: May 12, 1972

[21] Appl. No.: 252,799

[52] U.S. Cl. .................................. 325/363, 73/355
[51] Int. Cl. ............................................ H04b 1/00
[58] Field of Search ...................... 73/355; 250/83; 307/240, 265; 325/363; 343/17.7

[56] References Cited
UNITED STATES PATENTS

| | | | |
|---|---|---|---|
| 3,409,827 | 11/1968 | Goggings, Jr. | 325/363 |
| 3,564,252 | 2/1971 | Stoft | 73/355 |
| 3,693,095 | 9/1972 | Wilt | 325/363 |
| 3,628,151 | 12/1971 | Roeder | 325/363 |
| 3,634,767 | 1/1972 | Roeder | 325/363 |

Primary Examiner—Benedict V. Safourek
Assistant Examiner—Marc E. Bookbinder
Attorney—L. Lee Humphries et al.

[57] ABSTRACT

A radiometer system comprising an antenna; a reference signal source; sampling means connected to receive and alternately pass signals from said antenna and from said reference source; a constant amplitude noise source; switch means connected to add the output of said noise source to the signals from said antenna before said signals from said antenna are applied to said sampling means; a constant temperature enclosure enclosing said reference source, said sampling means, said noise source, and said switch means, and maintaining the enclosed components at a known temperature; comparison means connected to receive and compare the signals passed by said sampling means and to emit an error signal indicative of any difference between the signals from said reference source and the sum of the signals from said antenna and the output of said noise source; and means responsive to said error signal for controlling actuation of said switch.

2 Claims, 2 Drawing Figures

PRECISION VARIABLE PULSE RATE NULLING RADIOMETER

BACKGROUND OF THE INVENTION

1. Field of the Invention

This invention relates to temperature sensing devices and is particularly directed to improved radiometers for accurately sensing the temperature of a remote object.

2. Prior Art

Until recently most of the effort aimed at the development of remote sensors for earth applications has been concentrated on those for measurement of atmospheric properties. However, improved instrumental techniques and a better understanding of the transmission properties of the atmosphere have led to much more interest in viewing quantitiatively the properties of the earth's surface. One of the more significant and practical global measurements that can be made from a satellite is the absolute ocean surface temperature. A preliminary rationale for the importance of such observations to the meterological and oceanographic community was reported a few years ago by a panel of the National Academy of Sciences (1969).

Measurement of sea surface temperature from satellite-borne instruments has already been performed with some success using infrared radiometers wave length on Nimbus vehicles. Experiments to deduce sea temperature from infrared detectors at other wave lengths are being planned, and some success has been achieved for measuring gradients of temperature at the sea surface by aircraft-borne infrared radiometers. These infrared experiments have demonstrated important capability by achieving useful observations of sea surface temperature. However, they suffer severe degradation when operated at high altitudes by rain cloud interference, and sun glitter from the water surface. It is possible to avoid these difficulties, in principle, by using microwave radiometry to determine sea temperature within a 24 hour, all weather operational capability.

Over the past 25 years, numerous types of microwave radiometers have been proposed. However, although some of these prior art radiometers can provide very high temperature resolution, none of the prior art devices has been capable of accurately measuring absolute temperature. Most prior art radiometers are subject to internal temperature gradient which tends to obscure absolute temperature determinations. In addition, electrical noise introduced by the antenna and within the internal circuitry tends to further obscure absolute measurements. Furthermore, amplifier gain instability often causes distortion of the signals. To overcome the latter problem, it has become common to employ the Dicke radiometer circuit wherein the signals from the antenna are sampled and compared with signals from a second signal source which is maintained at a known constant temperature. This overcomes some of the problems of amplifier instability, but in general does not alter effects due to imperfect components and thermal gradients. To overcome these problems, it has been proposed to modify the Dicke circuit by providing a variable amplitude noise source, injecting the noise signal between the antenna and the sampling switch, and varying the amplitude of the injected noise signal to cause the sum of the antenna signal and the injected noise signal to equal the value of the signal from the known constant temperature source. Theoretically, the amplitude of the injected noise signal could be measured or varied in a known fashion and, since the temperature of the constant temperature source was known, the value of the antenna signal could readily be determined. Unfortunately, by conventional means, it is extremely difficult to measure or vary the amplitude of the noise signal to the required accuracy. Moreover, where changes occur in the temperature sensed by the antenna, it is necessary to vary the magnitude of the injected noise signal. However, most noise sources respond relatively slowly to changes in amplitude. Consequently, such systems tend to distort or obliterate the signal sensed by the antenna when the temperature of the target object is changing. Furthermore, thermal gradients within the noise injection circuitry present additional sources of possible error. Thus, none of the prior art techniques have been entirely satisfactory.

BRIEF SUMMARY AND OBJECTS OF INVENTION

These disadvantages of the prior art are overcome with the present invention and a novel radiometer system is provided which can reliably measure absolute temperatures to an accuracy within 1°K for target temperatures within the range of 100°K to 300°K, even where the temperature of the target is irregular.

The present invention consists of the following — a unique radiometric sensor which combines exceptionally high linearity and exceptionally high absolute accuracy. These characteristics depend on (1) a unique method of noise injection, namely variable frequency constant amplitude noise pulses, which is capable of very high linearity, and (2) a nulling mode of operation which, in conjunction with certain specified components of the radiometer being held at a known uniform temperature, results in the absolute accuracy of the instrument being independent to an arbitrarily high degree of the non-ideality of certain specified components. In all previous radiometers these said components have constituted major sources of error.

The advantages of the present invention are preferably attained by providing a radiometer circuit comprising an antenna; a reference signal source; sampling means connected to receive signals from said antenna and signals from said reference source and serving to alternately pass said signals from said antenna and said signals from said reference signal source; a constant amplitude noise source; switch means connected to add the output of said noise source to the signals from said antenna before said signals from said antenna are applied to said sampling means, said switch means being actuatable to block passage of said output of said noise source; a constant temperature enclosure enclosing said reference signal source, said sampling means, said noise source and said switch means, and maintaining the enclosed components at a known temperature; comparison means connected to receive and compare the signals passed by said sampling means and to emit an error signal indicative of any difference between the signals from said reference signal source and the sum of the signals from said antenna and the output of said noise source; and means responsive to said error signal for controlling the actuation of said switch means.

Accordingly, it is an object of the present invention to provide improved methods and apparatus for measuring the temperature of remote objects.

Another object of the present invention is to provide improved methods and apparatus for accurately measuring the absolute temperature of remote objects.

An additional object of the present invention is to provide improved methods and apparatus for microwave radiometry.

A specific object of the present invention is to provide a radiometer circuit comprising an antenna; a reference signal source; sampling means connected to receive signals from said antenna and signals from said reference signal source and serving to alternately pass said signals from said antenna and said signals from said reference signal source; a constant amplitude noise source; switch means connected to add the output of said noise source to the signals from said antenna before said signals from said antenna are applied to said sampling means, said switch means being actuatable to block passage of said output of said noise source; a constant temperature enclosure enclosing said reference signal source, said sampling means, said noise source, and said switch means; comparison means connected to receive and compare the signals passed by said sampling means and to emit an error signal indicative of any difference between the signals from said reference signal source and the sum of the signals from said antenna and the output of said noise source; and means responsive to said error signal for controlling the actuation of said switch means.

These and other objects and features of the present invention will be apparent from the following detailed description, taken with reference to the accompanying drawing.

DETAILED DESCRIPTION OF ILLUSTRATED EMBODIMENT

Figure 1:
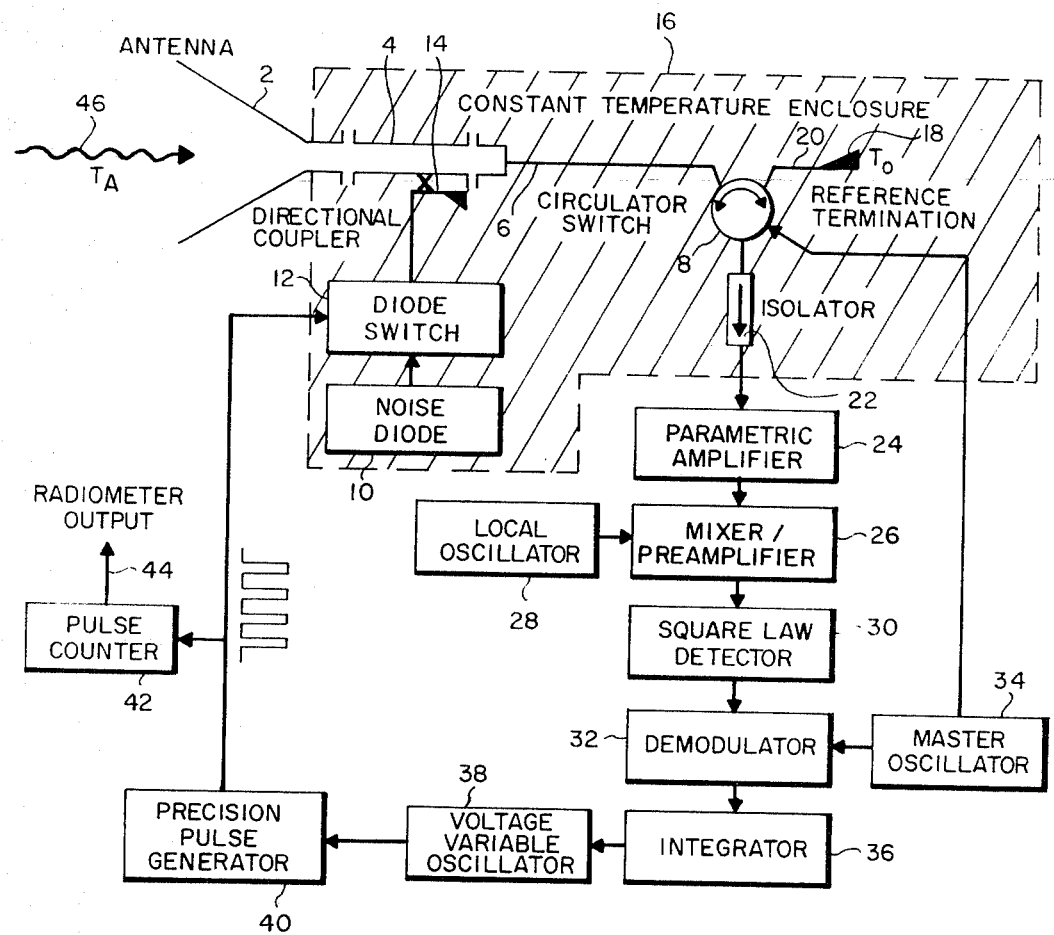
FIG. 1 is a diagrammatic representation of a radiometer embodying the present invention.
Figure 2:
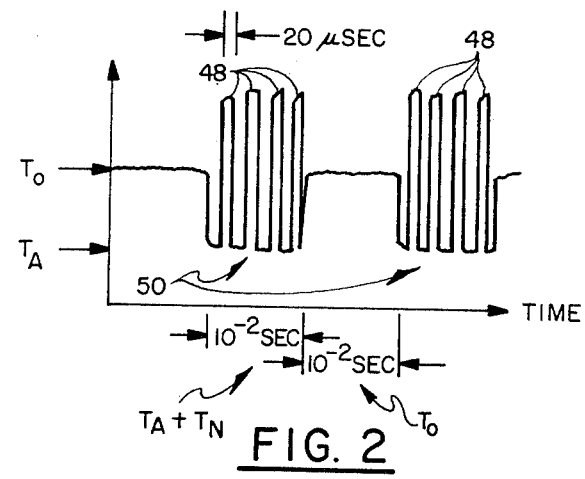
FIG. 2 is a diagrammatic representation of the signal output from the square law detector of the device of FIG. 1.

In that form of the present invention chosen for purposes of illustration in the drawing, FIG. 1 shows a radiometer system having an antenna 2 which receives signals from a target object in a conventional manner and passes the received signals through a suitable wave guide 4 and conductor 6 to a sampling device, such as circulator switch 8. A noise source 10 generates a constant amplitude output which is applied through a suitable switch 12 to a directional coupler 14 which adds the noise output passed by switch 12 to the antenna signal in the wave guide 4. The wave guide 4, conductor 6, sampling device 8, noise source 10, switch 12, and coupler 14 are housed within a constant temperature enclosure 16 where they are maintained at a constant, known temperature. In addition, a reference signal source 18 is housed within the constant temperature enclosure 16 and is connected by conductor 20 to apply reference signals to the sampling device 8. The signals passed by the sampling device 8 are applied to a suitable isolator 22, which is also located within the constant temperature enclosure 16, and then are passed out of the enclosure 16 and are amplified by a suitable amplifier 24. Next, the signals are applied to a mixer 26, where they are mixed with signals from a local oscillator 28, and are passed to a square law detector 30. The output of the detector 30 is substantially as shown in FIG. 2 and this output is passed to a demodulator 32 which is synchronized, by master oscillator 34, with the sampling device 8. The output of the demodulator 32 is applied to a smoothing device, such as integrator 36, and the resulting voltage is applied to a variable voltage oscillator 38 which emits a square wave signal at a frequency which is high compared to the frequency of the master oscillator 34 and which is indicative of the magnitude of the voltage from integrator 36. This square wave signal is applied to drive a pulse generator 40 which emits pulses of uniform amplitude width at the frequency of the square wave signal from oscillator 38. The pulses from pulse generator 40 are applied to control the actuation of switch 12 and are also supplied to a pulse counter 42 which applies a signal, indicative of the pulse rate, to output 44 as the output of the radiometer.

In use, radiation signals from the target object are sensed by the antenna 2, as indicated by arrow 46, and are applied via wave guide 4 and conductor 6 to the sampling device 8. At the same time, the reference signal source 18 emits a constant level reference signal, indicative of the known temperature within the enclosure 16, and this reference signal is applied via conductor 20 to the sampling device 8. The sampling device 8 alternately passes the signals from conductor 6 and the reference signal from conductor 20 at a sampling rate determined by the master oscillator 34, and these signals are amplified by amplifier 24, mixed with the output of the local oscillator 28 by mixer 26, and passed to the square law detector 30. Switch 12 is normally non-conducting and, hence, serves to block passage of the output of noise generator 10. Consequently, at this point, the output of the detector 30 will be a square wave having an upper level at the magnitude of the reference signal, indicated at $T_o$ in FIG. 2, and a lower level at the magnitude of the antenna, indicated at $T_A$ in FIG. 2. This output is passed through demodulator 32 and integrator 36 to provide a direct voltage having a magnitude equal to $T_o$ minus $T_A$. This difference voltage is applied to oscillator 38 which emits a square wave signal at a frequency which is high compared to the frequency of the master oscillator 34 and which is indicative of the magnitude of the difference voltage and this square wave signal is applied to drive pulse generator 40.

The pulse generator emits pulses of uniform width and amplitude at the frequency determined by oscillator 38 and these pulses each serve to open and close the switch 12 to pass a pulse of noise from the noise generator 10. Obviously, the switch 12 must be a high speed switch, such as a diode switch. The output of the noise generator 10 must be of uniform amplitude. This can be accomplished with substantially any desired type of noise generator. However, it is found that at microwave frequencies solid state noise diodes are preferable for this purpose.

Each time that the switch 12 is actuated by a pulse from pulse generator 40, the switch 12 opens to pass a noise pulse from the noise generator 10. Since the pulses actuating switch 12 are of uniform width and the output of noise generator 10 is of uniform amplitude, it will be seen that the noise pulses passed by switch 12 will be of uniform width and amplitude and will occur at a frequency, determined by oscillator 38, which is indicative of the difference in voltage between the antenna signal and the reference signal. These noise pulses are added to the antenna signal by directional coupler 14 and the sum of the noise pulses and the antenna signal is passed through conductor 6 to the sampling device 8, and, hence, is passed through amplifier 24, mixer 26, and square law detector 30. As a result, the output of the square law detector 30 will show the noise pulses, indicated at 48, appearing as excursions from the level of the antenna signal, indicated at 50, with intervening intervals at the level of the reference signal $T_o$. When this output is passed through the demodulator 32 and integrator 36, the area under the noise pulses 48 will be added to the value of the antenna signal and, hence, will tend to effectively reduce the difference between the antenna signal level $T_A$ and the reference signal level $T_o$. As a result, the voltage applied to oscillator 38 will be reduced and, consequently, the frequency of the square wave signal from oscillator 38 and the rate of actuation of switch 12 will be similarly reduced. When the value of the sum of the antenna signal plus the noise pulses ($T_A + T_N$) is equal to the value of the reference signal ($T_o$), a null condition is obtained, whereupon the voltage from demodulator 32 and the frequency of oscillator 38 and the pulse rate from pulse generator 40 will become stabilized. Obviously, if the temperature of the target changes, the null condition will be upset and the foregoing steps will be repeated until a new null is obtained.

The advantages of maintaining the said input components at a common temperature can be understood by reference to FIG. 1. First suppose that the noise from noise diode 10 is injected in a continuous rather than pulsed fashion. The condition for a null at the output of the demodulator 32 is that the effective noise temperature incident on the circulator switch 8 be exactly equal to $T_o$, the temperature of the enclosure 16. This result is completely independent of losses or reflections in the circulator switch 8, inperfections in the reference termination 18, finite switching times of circulator switch 8, etc., provided only that the isolator 22 "isolates" well enough. Furthermore, this said result is also valid for the case of pulsed noise injection provided that the detector 30 has a square law characteristic. The linearity of the present radiometer is a direct consequence of the unique method of noise injection and the use of the square law detector 30.

It can be shown that the temperature sensed by the antenna 2 is related to the frequency of the pulses from pulse generator 40 by the relationship $$f_p = K [T_o - (tT_A + (1 - t) T_p)] \qquad (1)$$

where $f_p$ is the pulse frequency, $K$ is the calibration constant for the noise injection system, $T_o$ is the temperature of the reference signal source, $t$ is the transmission coefficient from the antenna to the point of noise injection, $T_A$ is the antenna temperature, and $T_p$ is the physical temperature of the antenna and components up to the point of noise injection.

With the radiometer of the present invention $T_p$ is substantially equal to $T_o$, due to the fact that all of the signal source and noise injection components, except the antenna 2, are contained within the constant temperature enclosure 16. Thus, for calibration, equation (1) may be assumed to be $$f_p = Kt (T_o - T_A) \qquad (2)$$

The system may be calibrated by pointing the antenna 2 at a cold source whose temperature is known or by replacing the antenna 2 with a cooled reference termination and correcting for antenna losses separately, whereupon the calibration constant $Kt$ can readily be obtained. Thereafter, the pulse counter 42 can be made to provide a signal on output 44 in which the temperature of the target object is readable directly in degrees Kelvin.

Obviously, numerous variations and modifications may be made without departing from the present invention. Accordingly, it should be clearly understood that the form of the present invention described above and shown in the accompanying drawing is illustrative only and is not intended to limit the scope of the present invention.

What is claimed is:

1. A radiometer circuit comprising:

an antenna;

a reference signal source;

sampling means connected to receive signals from said antenna and signals from said reference signal source and serving to alternately pass said signals;

a constant amplitude noise source;

switch means connected to add the output of said noise source to the signals from said antenna before said signals from said antenna are applied to said sampling means;

comparison means connected to receive and compare the signals passed by said sampling means and to emit an error signal indicative of any difference between the signals from said reference signal source and the sum of the signals from said antenna and the output of said noise source; and pulse generating means serving to supply pulses of uniform width to actuate said switch at a frequency determined by the magnitude of said error signal.

2. The method of radiometry comprising the steps of:

A. Sensing radiation from a target object and establishing a first electrical signal indicative of said radiation, B. establishing a second electrical signal indicative of a known condition, C. sampling said first and second electrical signals during alternate intervals, D. establishing a voltage signal indicative of the difference in magnitude between the signals sampled during said alternate intervals, E. generating a constant amplitude noise signal, F. passing uniform width pulses of said noise signal at a frequency determined by and indicative of said voltage signal, G. adding said pulses of said noise signal to said first signal, H. repeating steps C, D, F, and G until the magnitude of the sum of said first signal and said noise pulses is equal to the magnitude of said second signal, and I. indicating the frequency of said noise pulses required to maintain the equality of step H.

* * * * *

UNITED STATES PATENT OFFICE
CERTIFICATE OF CORRECTION

PATENT NO. : 3,777,270
DATED : Dec. 4, 1973
INVENTOR(S) : Walter N. Hardy et al

It is certified that error appears in the above–identified patent and that said Letters Patent are hereby corrected as shown below:

Cover page (75) the first inventor's name delete the initial "H" and insert --N--.

Signed and Sealed this

Twenty-first Day of September 1976

[SEAL]

Attest:

RUTH C. MASON
Attesting Officer

C. MARSHALL DANN
Commissioner of Patents and Trademarks